(12) United States Patent
Humhauser et al.

(10) Patent No.: US 10,294,963 B2
(45) Date of Patent: May 21, 2019

(54) AXIALLY SPLIT INNER RING FOR A FLUID FLOW MACHINE, GUIDE VANE RING, AND AIRCRAFT ENGINE

(71) Applicant: MTU Aero Engines AG, Munich (DE)

(72) Inventors: Werner Humhauser, Moosburg (DE); Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 289 days.

(21) Appl. No.: 15/042,419

(22) Filed: Feb. 12, 2016

(65) Prior Publication Data

US 2016/0238028 A1 Aug. 18, 2016

(30) Foreign Application Priority Data

Feb. 16, 2015 (EP) .................................. 15155242

(51) Int. Cl.
| | |
|---|---|
| *F01D 11/00* | (2006.01) |
| *F04D 29/54* | (2006.01) |
| *F04D 19/00* | (2006.01) |
| *F04D 29/08* | (2006.01) |
| *F04D 29/52* | (2006.01) |

(52) U.S. Cl.
CPC .......... *F04D 29/542* (2013.01); *F01D 11/001* (2013.01); *F04D 19/00* (2013.01); *F04D 29/083* (2013.01); *F04D 29/522* (2013.01); *Y02T 50/671* (2013.01)

(58) Field of Classification Search
CPC ...... F01D 11/001; F01D 9/04; F05D 2240/11; F05D 2220/32; Y02T 50/671
See application file for complete search history.

(56) References Cited

U.S. PATENT DOCUMENTS

| | | | | |
|---|---|---|---|---|
| 5,201,846 | A | * | 4/1993 | Sweeney ................... F01D 9/04 415/170.1 |
| 5,421,703 | A | * | 6/1995 | Payling ................... F01D 9/042 415/209.3 |
| 8,240,043 | B2 | * | 8/2012 | Duesler ................ F01D 11/001 29/412 |
| 2016/0115966 | A1 | * | 4/2016 | Wulf ..................... F01D 11/001 415/148 |
| 2016/0138413 | A1 | * | 5/2016 | Cortequisse ............ F01D 9/042 415/173.4 |
| 2016/0237855 | A1 | * | 8/2016 | Humhauser ........... F01D 11/001 |

FOREIGN PATENT DOCUMENTS

EP 2716874 A1 * 4/2014 ........... E04D 29/644

\* cited by examiner

*Primary Examiner* — Matthew W Jellett
(74) *Attorney, Agent, or Firm* — Crowell & Moring LLP

(57) ABSTRACT

An axially split inner ring for a fluid flow machine is disclosed. The inner ring is constructed for connecting to guide vanes and includes at least a first ring segment arranged upstream and a second ring segment arranged downstream. The second ring segment has a first sealing segment, where at least one section of the second ring segment is arranged in a radially inward manner relative to the first ring segment. A guide vane ring of a fluid flow machine and an aircraft engine are also disclosed.

11 Claims, 3 Drawing Sheets

AXIALLY SPLIT INNER RING FOR A FLUID FLOW MACHINE, GUIDE VANE RING, AND AIRCRAFT ENGINE

This application claims the priority of European Patent Application No. EP 15155242.9 filed Feb. 16, 2015, the disclosure of which is expressly incorporated by reference herein.

BACKGROUND AND SUMMARY OF THE INVENTION

The present invention relates to an axially split inner ring for a fluid flow machine. In addition, the present invention relates to a guide vane ring as well as an aircraft engine.

In fluid flow machines, particularly in axial gas turbines, stator assemblies (hereinafter the terms stator assembly and guide vane ring are used synonymously) are often connected on the radial inner end to inner rings to stabilize the guide vanes and to mount inlet seals. The inlet seals are intended to at least decrease leakage flows between a rotor and the guide vane ring. For the inner rings, there are various designs. For example, there are multi-part inner rings that can be split radially, axially, as well as circumferentially. Axially split inner ring segments are generally screwed together. For attaching or connecting the inlet seals to the inner ring, there are various designs. For example, the inlet seals may be attached to an additional flange. This additional flange can then be connected to the inner ring or to individual inner ring segments, for example by means of screw connections.

One objective of the present invention is to propose an additional attachment or connection of inlet seals to inner rings.

According to the invention, an axially split inner ring designed for connecting to guide vanes is proposed for a fluid flow machine. The axially split inner ring includes at least a first and a second ring segment. The first ring segment is arranged upstream from the second ring segment. The second ring segment has a first sealing segment. Furthermore, at least one section of the second ring segment is arranged radially inward relative to the first ring segment.

Sealing segments can be designed differently, for example as an inlet seal, labyrinth seal, slide seal, and so on. The sealing segments of the axially split ring according to the invention are arranged in particular on the end face radially inward on the inner ring. Sealing segments can advantageously minimize or at least decrease leakage flows between the guide vanes and a radially inward arranged rotor of the fluid flow machine.

Advantageous developments of the present invention are each the subject matter of dependent claims and embodiments.

Sample embodiments according to the invention may have one or more of the features mentioned hereafter.

Fluid flow machines are in particular axial fluid flow machines, for example axial gas turbines.

Axial direction refers in particular to the main through-flow direction of the fluid flow machine. The radial direction is oriented perpendicular to the axial direction. In particular, the longitudinal axes of rotor blades and guide vanes may be oriented radially.

In certain embodiments according to the invention, the second ring segment is connected to at least a first sealing segment. In addition, sections of the second ring segment and sections of the first sealing segment may extend upstream across the axial width of the first ring segment. The first ring segment may be limited or covered radially inward by sections of the second ring segment. Consequently, sections of the second ring segment on a radially inward side of the first ring segment can extend at least across its axial extension.

The at least two ring segments of the axially split inner ring may be constructed in various ways. For example, bearing journals of the guide vanes may be arranged in a dividing plane of the interconnected ring segments. The guide vanes may be adjustable, i.e., they may be rotatable about their longitudinal axis. By means of rotatable guide vanes, various angles of attack can be advantageously adjusted for the incident flow of the rotor blades, to achieve favorable efficiencies of individual, operating points, for example.

The ring segments may be connected to each other in a form-fitting and/or force-fitting manner. For example, a force fit can be achieved by means of ring segment screw connections distributed over the circumference. For example, the second ring segment can surround the first ring segment, or vice versa, or can fit together in a U-shaped manner or an b-shape manner. The ring segments may be connected to each other in a wholly or partially form-fitting manner.

In certain embodiments according to the invention, the first ring segment and/or the second ring segment are segmented in the circumferential direction (perpendicular to the radial direction, whereby the radial direction is oriented perpendicular to the axial direction of the fluid flow machine). For example, the first ring segment and/or the second ring segment may have in the circumferential direction half-rings, each having a circumferential angle of 180 degrees. The ring segments may also be split multiple times, for example in three segments, each with 120 degrees of circumferential angle, in four segments each with 90 degrees of circumferential angle, and so on. The ring segments may also be subdivided into various circumferential angles.

In some embodiments according to the invention, the second ring segment is connected to a second sealing segment or has a second sealing segment. The second sealing segment is arranged downstream from the first sealing segment and/or downstream from the first ring segment. The second sealing segment is constructed in its function and its structure in a manner particularly corresponding to the first sealing segment, particularly as an inlet seal.

In some embodiments according to the invention, the second sealing segment is arranged on a radius that is larger than the average radius of the radial extension of the first ring segment. The average radius of the radial extension of the first ring segment is the geometric average (or half) radius between the radially external and the radially internal radius of the first ring segment. Consequently, the second ring segment is offset radially in relation to the first ring segment and arranged radially further outward. Such an arrangement advantageously allows cavities of the flow channel to decrease downstream from the inner ring.

A cavity may be described, as the region of the flow channel between a guide baffle (which has the inner ring according to the invention radially inward, on the end face) and a subsequent rotor stage with guide vanes. A smaller cavity may reduce the flow losses in the region of the first and second sealing segments. The efficiency of the fluid flow machine can be increased, at least in a few operating points.

In certain embodiments according to the invention, the inner ring has more than two sealing segments. For example, an additional sealing segment may be arranged directly upstream or downstream of the first and/or the second sealing element. Similarly, an additional sealing segment may be arranged on a wider radius that is smaller or greater than the average radius of the radial extension of the first ring segment.

In particular embodiments according to the invention, the sealing segment is an inlet seal. The inlet seal may be referred to or constructed as an inlet coating, a brush-on seal, a hexagonal-pored seal, a honeycomb seal, metal foam, or an open-pored metal sponge. The hollow spaces of the metal sponge can be filled at least regionally with an additional material, such as a polymer for example. By means of an inlet coating, a low-wear or wear-free brushing of a rotor relative to a guide ring (or generally relative to a static fluid flow machine component) can be achieved. The sealing function is achieved on the rotor-side by means of so-called sealing fins, which for example can form a labyrinth seal when a plurality of sealing fins is arranged one after the other on an inlet seal.

In some embodiments according to the invention, at least one sealing segment is connected in a form-fitting and/or material-fitting manner to the inner ring. The inner ring may be referred to as a carrier of the sealing segment. The sealing segment may be connected to the inner ring in a material-fitting manner, particularly by means of adhering or soldering. The sealing segment can also be connected to the inner ring in a form-fitting manner, for example by means of a spring-groove connection. The inner ring can have a circumferential groove, into which segmented seal carriers are placed or inserted about the circumference.

In certain embodiments according to the invention, at least one sealing segment and/or at least one ring segment are produced by means of a generative production method. A generative production method may be referred to as an additive production method or as a rapid prototyping method. Generative production methods include, for example, stereo-lithography, selective laser melting, selective laser sintering, fused deposition modeling, laminated object modeling, 3D printing, as well as cold-gas injection.

In particular, at least one sealing segment and the second ring segment are produced together by means of a generative production method. In doing so, various materials can be used on the one hand for the ring segment, and on the other for the sealing segment, which is constructed in particular as an inlet seal.

Production of the sealing segment and the ring segment in one production step may advantageously allow one to omit performing an assembly step. In addition, the measurement tolerance of the component can be increased or improved, since the assembly step consisting of possible gluing or soldering (which may cause a thermal warpage for example) is no longer necessary.

Some or all embodiments according to the invention may have one, multiple, or all of the advantages mentioned above and/or below.

By means of the axially split inner ring according to the invention, in which the downstream ring segment has at least one sealing segment, the number of parts of the inner ring may be reduced. By means of the functional connection of the ring segment to the sealing segment, a separate seal carrier segment may be advantageously omitted. The assembly effort is consequently decreased. Elevated production tolerances in an assembly with a separate seal carrier segment according to prior art are advantageously avoided. In this way, the overall production costs can be reduced.

By means of the axially split inner ring according to the invention, the number of possible leakage points in the region of the inner ring and the seal may be reduced compared to a design according to prior art having a separate seal carrier. In this way, the efficiency can be advantageously increased.

By means of the axially split inner ring according to the invention, the number of parts and thus the weight of the fluid flow machine can be advantageously reduced. In this way, additional advantages, for example, lower fuel consumption when used in an aircraft engine, can be achieved.

By means of the functional connection of the second downstream ring segment to the sealing segment of the axially split inner ring according to the invention, the size of the cavity between the inner ring and the rotor segment arranged further downstream can be reduced. In this way, flow losses (leakage flows) can be advantageously decreased.

The present invention is explained generically below by means of the attached drawings, in which identical reference signs describe identical or similar components.

DETAILED DESCRIPTION OF THE DRAWINGS

Figure 1:
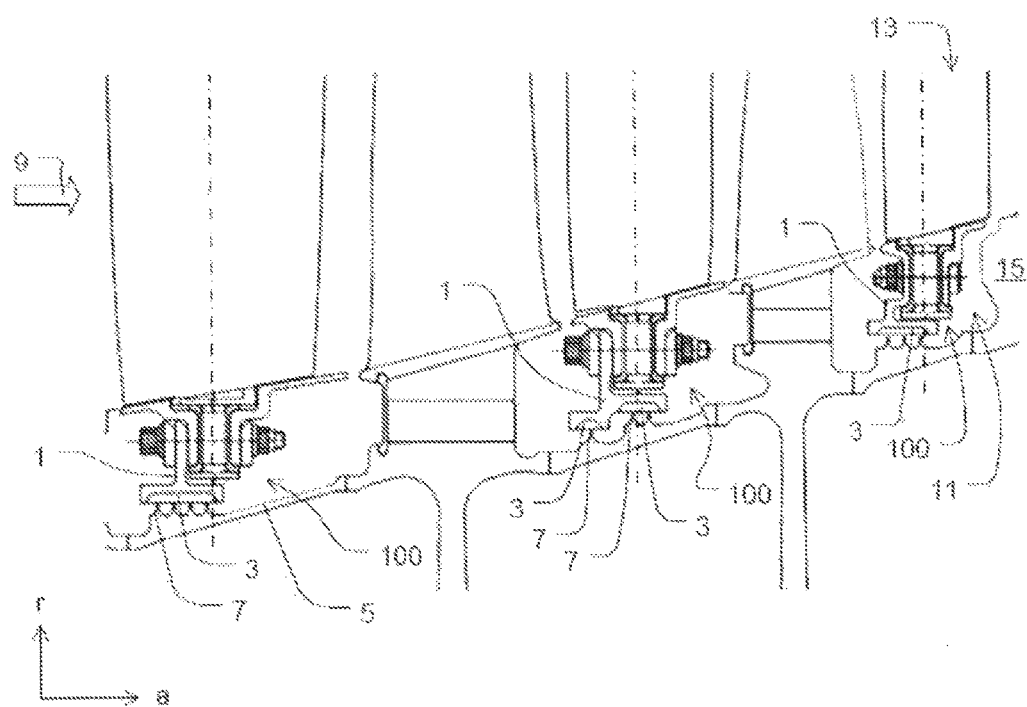
FIG. 1 depicts arrangements of inner rings with seal carriers according to prior art.

FIG. 1 depicts arrangements of inner rings 100 with seal carriers 1 according to prior art. The left and middle inner rings 100 each have separate seal carriers 1 with seal segments 3. The right inner ring 100 has an upstream ring segment as a seal carrier 1.

The left inner ring 100 has a wide (relative to axial direction a) seal segment 3. On rotor arm 5, there are depicted four seal fins 7 arranged axially one behind the other, which engage in seal segment 3 constructed as an inlet seal. The successively arranged sealing fins 7 may be described as a labyrinth seals. Separate seal carrier 1 is connected to inner ring 100 by means of a screw joint. Separate seal carrier 1 is flange-mounted on inner ring 100. Due to the separate construction of seal carrier 1, the arrangement has a higher weight and greater production tolerances compared to inner ring 200 according to the invention (see FIG. 2).

Middle inner ring 100 is constructed similarly to left inner ring 100, yet it has two sealing segments 3 that are separated from each other. Sealing segments 3 are arranged in a radially offset manner. All in all, three sealing fins 7 engage in the downstream sealing segment 3 constructed as an inlet seal.

Right inner ring 100 has a ring segment, arranged upstream (against the main through-flow direction 9) opposite the axial direction a, as a seal carrier 1 with a sealing segment 3. As a result of sealing segment 3, which is connected to the upstream ring segment, there is a large, deep, and open cavity 11 between guide baffle 13 and a subsequent rotor stage 15.

Figure 2:
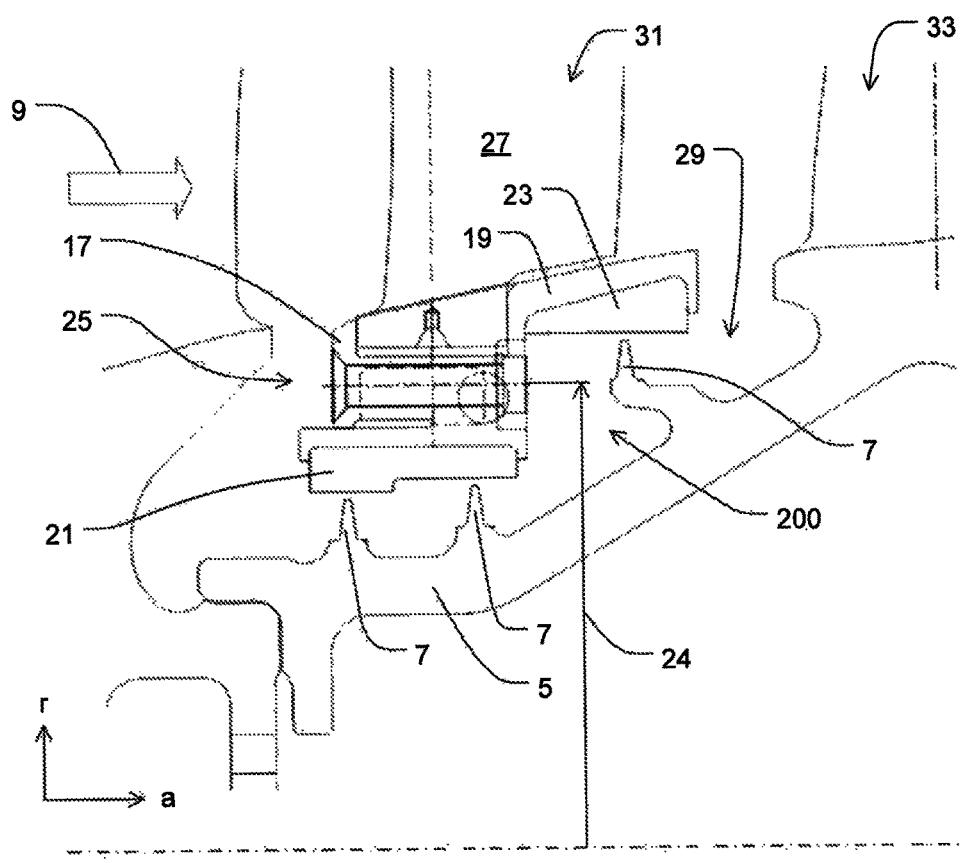
FIG. 2 depicts a cross-sectional view of an axially split inner ring according to the invention with two sealing segments.

FIG. 2 depicts a cross-sectional view of axially split inner ring 200 according to the invention with a first, upstream ring segment 17, a second downstream ring segment 19, as well as a first, upstream sealing segment 21 and a second downstream sealing segment 23.

Both ring segments 17, 19 are connected to each other by means of a screw joint 25. Axially split inner ring 200 according to the invention is fixed on its end face to a guide vane 27 in a radially inward manner.

Sealing segments 21, 23 are constructed as inlet seals. Engaging into sealing segments 21, 23 are sealing fins 7, which are attached to a rotor arm 5 or integrally connected to rotor arm 5. Two sealing fins 7 engage into sealing segment 21. This arrangement can be referred to as a labyrinth seal. A sealing fin 7 engages into sealing segment 23. Both sealing segment 23 as well as downstream sealing fin 7 are arranged in an axially (downstream) and radially (radially outward) offset manner in relation to sealing segment 21. Second sealing segment 23 is arranged on a radius that is greater than average radius 24 of the radial extension of first ring segment 17. Due to this offset arrangement, cavity 29 (between guide baffle 31 and subsequent rotor stage 33) is smaller in relation to a cavity 11 according to prior art (see FIG. 1). In this way, the advantages discussed further above can be achieved.

Figure 3:
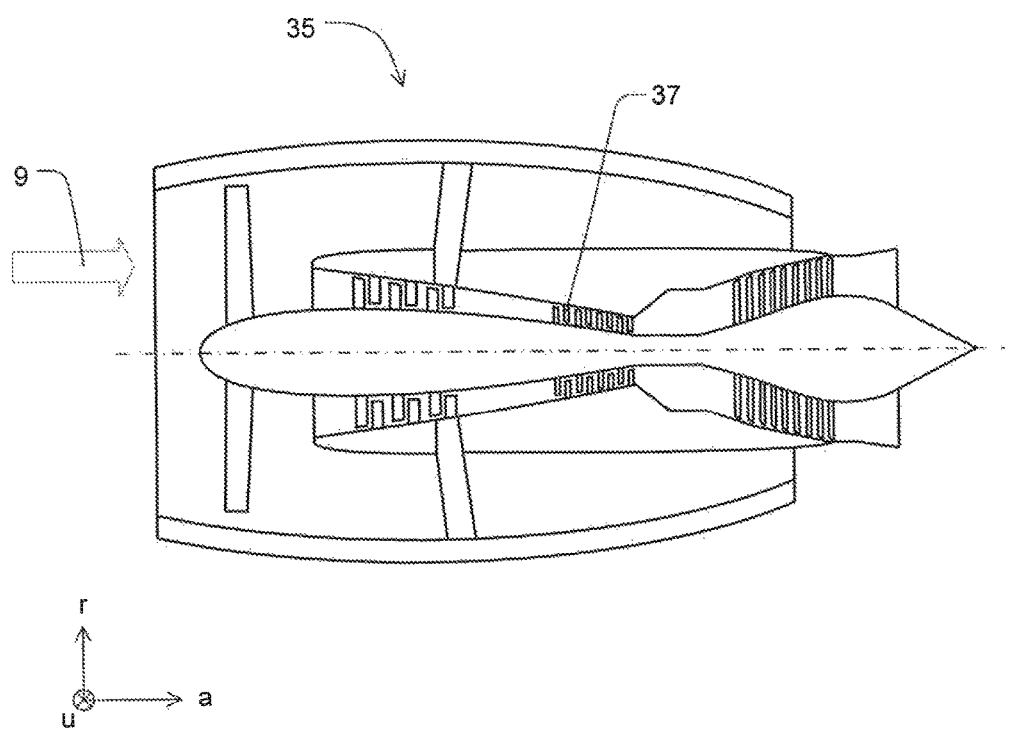
FIG. 3 depicts an aircraft engine according to the invention.

FIG. 3 schematically depicts in a highly simplified manner an aircraft engine 35 according to the invention with a guide vane ring 37 according to the invention. Guide vane ring 37 according to the invention is arranged, purely for example purposes, in a high-pressure compressor section of aircraft engine 35.

LIST OF REFERENCE CHARACTERS

100 Inner ring according to prior art
200 Inner ring
a axial; axial direction
r radial; radial direction
1 seal carrier
3 sealing segment
5 rotor arm
7 sealing fin
9 main through-flow direction
11 cavity of an arrangement according to prior art
13 guide baffle
15 rotor stage
17 first ring segment
19 second ring segment
21 first sealing segment arranged upstream
23 second sealing segment arranged downstream
24 average radius of radial extension of first ring segment
25 screw connection
27 guide vane
29 cavity of an arrangement with an inner ring according to the invention
31 guide baffle of an arrangement with an inner ring according to the invention
33 rotor stage of an arrangement with an inner ring according to the invention
35 aircraft engine
37 guide vane ring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inner ring of a fluid flow machine, wherein the inner ring is connected to guide vanes, comprising:
   a first ring segment; and
   a second ring segment, wherein the second ring segment is disposed downstream from the first ring segment in a direction of flow through the fluid flow machine;
   wherein the second ring segment has a first sealing segment and is connected to a second sealing segment or has a second sealing segment;
   wherein a radially innermost portion of the second sealing segment is disposed outside of an average radius of a radial extension of the first ring segment; and
   wherein at least one section of the second ring segment is arranged radially inward relative to the first ring segment.

2. The inner ring according to claim 1, wherein the second sealing segment is disposed downstream from the first sealing segment and/or is disposed downstream from the first ring segment.

3. The inner ring according to claim 2, wherein the first sealing segment and the second sealing segment are inlet seals.

4. The inner ring according to claim 2, wherein at least one of the first sealing segment and the second sealing segment is connected in a form-fitted and/or material-fitted manner to the inner ring.

5. The inner ring according to claim 2, wherein at least one of the first sealing segment and the second sealing segment and/or at least one of the first ring segment and the second ring segment is manufactured by a generative production process.

6. A guide vane ring of a fluid flow machine comprising an inner ring according to claim 1.

7. The guide vane ring according to claim 6, wherein the guide vane ring is connected to a housing of a compressor.

8. The guide vane ring according to claim 7, wherein the compressor is an axial high-pressure compressor.

9. An aircraft engine comprising at least one guide vane ring according to claim 6.

10. The inner ring according to claim 1, wherein the at least one section of the second ring segment and at least one section of the first sealing segment extend upstream in the direction of flow across an axial width of the first ring segment.

11. The inner ring according to claim 1, wherein the first ring segment is covered radially inward by the at least one section of the second ring segment.

* * * * *